Figure 1:
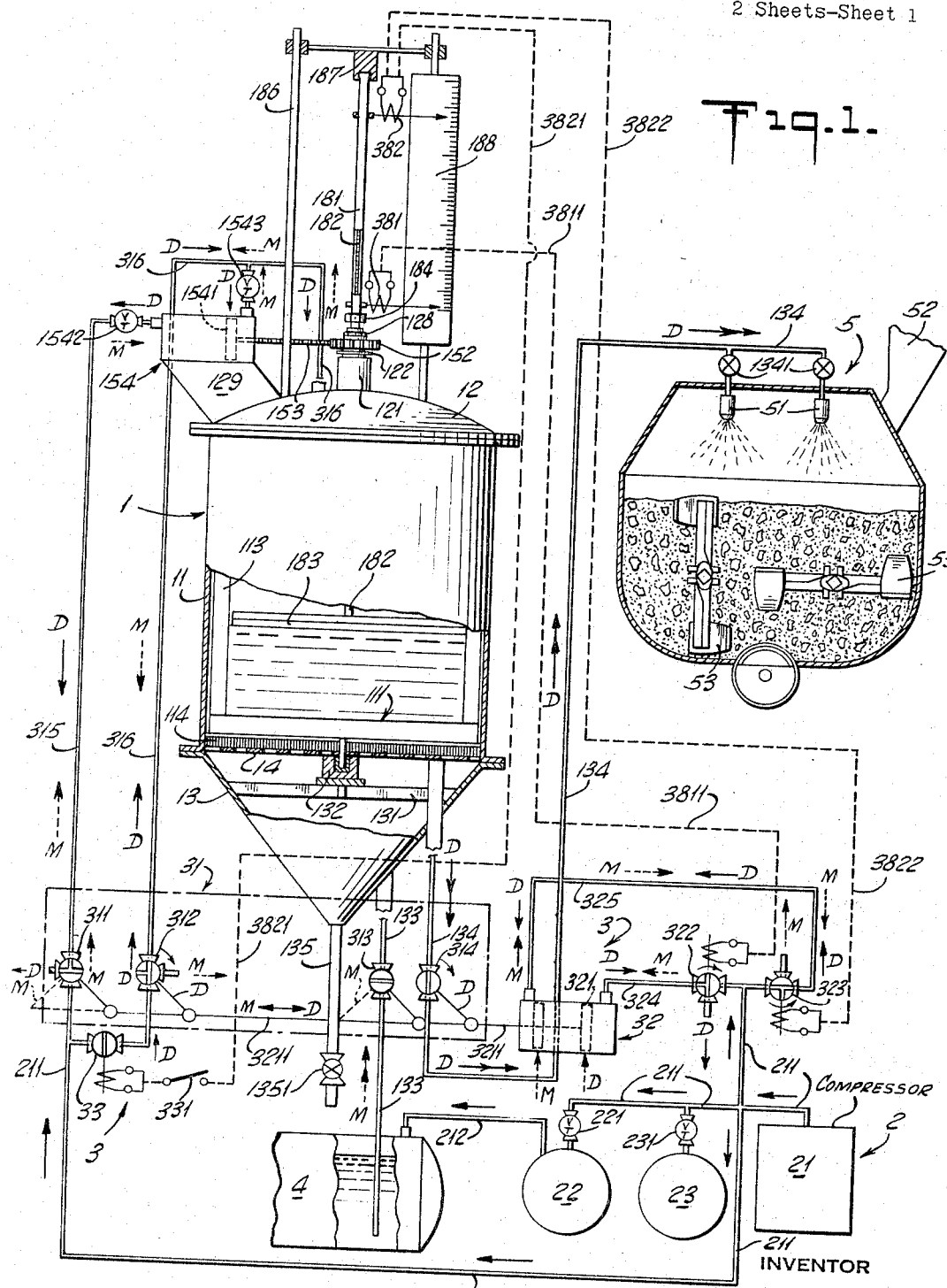

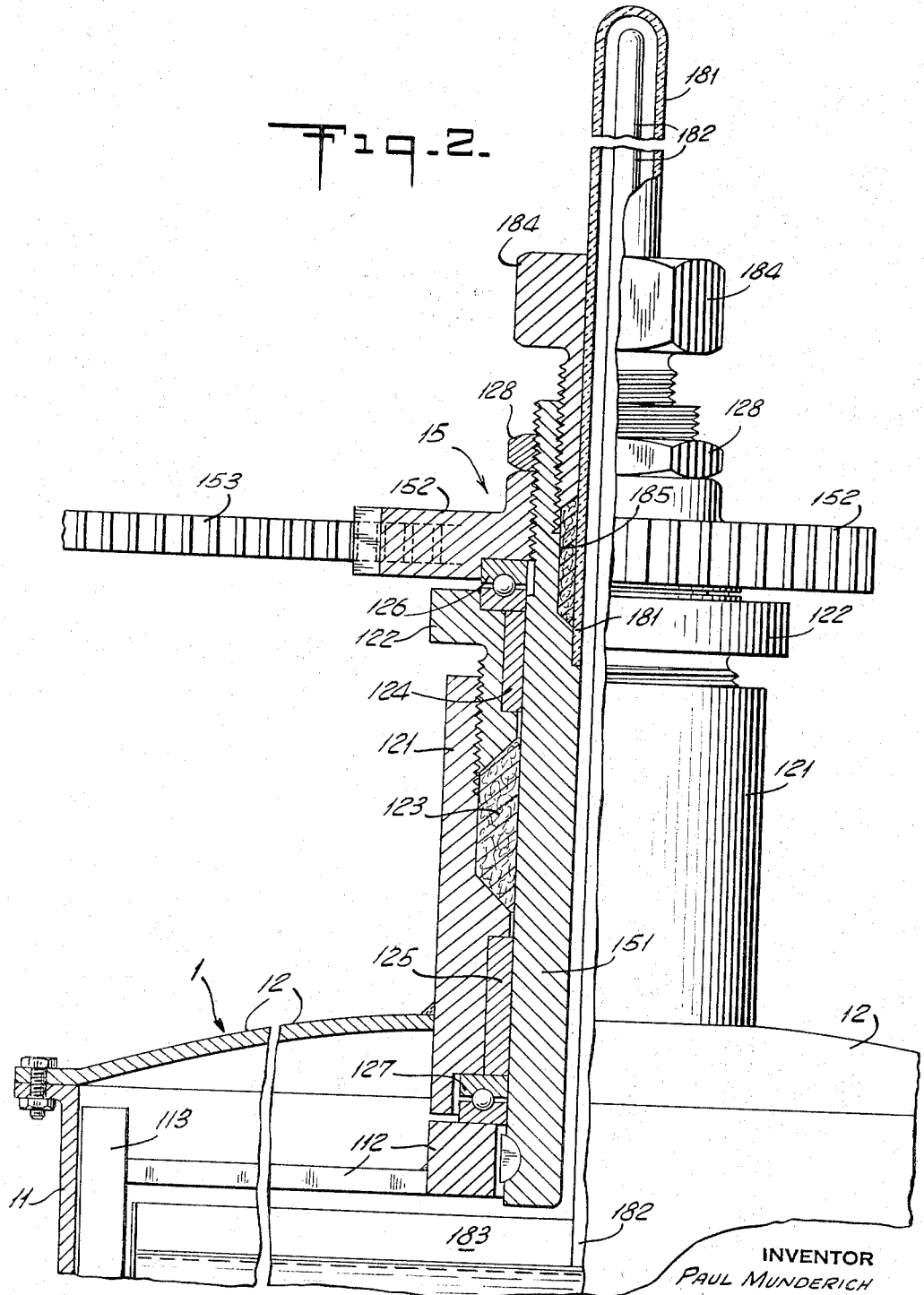

United States Patent Office 3,322,306
Patented May 30, 1967

3,322,306
MEASURING AND DOSING APPARATUS
Paul Munderich, Rothenbergen, Kreis Gelnhausen, Germany, assignor to Wibau Westdeutsche Industrie- und Strassenbau-Maschinen-Gesellschaft m.b.H., Rothenbergen, Kreis Gelnhausen, Germany
Filed Apr. 28, 1965, Ser. No. 451,410
Claims priority, application Germany, Oct. 20, 1964, W 37,792
15 Claims. (Cl. 222—67)

The present invention relates to a measuring and dosing apparatus, more particularly for handling thermoplastic substances which are difficult to convey, e.g., bituminous binders or natural asphalts, such as Trinidad asphalt. The apparatus also lends itself for handling bituminous emulsions which break up easily when preparing mixtures.

In treating such substances, difficulties have hitherto been experienced because the conveying pumps or the measuring vessels, or both, are subject to increased wear on account of the predominantly mineral constituents, or in consequence of the precipitation of originally suspended solids. Also, the latter causes heavy deposits on the rotating or reciprocating parts which are, therefore, subject to premature seizing.

Similar difficult conditions arise when treating bituminous emulsions. Compression or squeezing of these substances in the pumps and similar conveying means can hardly be avoided; also, the emulsions are subject to other mechanical strain effects whereby they are prematurely broken up. Thus, bitumen, on the one hand, and an aqueous liquid result, on the other, wherein the solids are not surrounded by or coated with the emulsion any more. This inevitably clogs the nozzles provided above the mixing unit, and also obstructs both the conveying and measuring elements of the equipment.

Previous suggestions for a more efficient way to convey sensitive liquids, which are difficult to measure and to administer, were not satisfactory in mixing installations for preparing bituminous mixtures incorporating emulsions or filled binders.

It is the object of the present invention to provide a measuring and dosing apparatus for liquids which is not, or only very slightly, liable to become worn, damaged or clogged by the treated bituminous substances and mixtures.

It is another object to provide an apparatus wherein alternating cycles of measuring a predetermined quantity, and of administering or dosing the same to a mixer or the like equipment can continuously be performed.

It is yet another object to use a gaseous fluid, e.g., compressed air, for conveying the thermoplastic substances to and from a combined measuring and dosing vessel.

It is a further object to provide a vessel of the kind described which acts as an open vessel during the measuring cycle and as a closed vessel for dosing the compressed fluid serving to fill up the vessel and subsequently to discharge it.

It is yet a further object to provide a measuring vessel which allows determination of the liquid amount with a high degree of accuracy.

Another object of the invention relates to providing the measuring space proper in the vessel so that any precipitation or deposit therein is promptly removed by a cyclically operated scraper or other cleaning elements.

It is one of the important features of the invention that a combined measuring and dosing vessel is used which acts as an open vessel while a predetermined amount of liquid is introduced and measured therein, while acting as a closed system in a subsequent operation during which a compressed fluid is used to compel or discharge the liquid of pre-measured quantity into a mixer or like equipment.

Another feature relates to the provision of a float within the vessel, and of a measuring rod connected therewith. The latter is vertically reciprocable in a non-magnetic material.

According to yet another feature, the rod is associated with a scale on which the zero and selective filled-up levels are indicated. Magnetic, electric, photoelectric or other means are used for providing switching functions in the topmost and lowermost positions of the measuring rod. By this expedient, the apparatus is switched over from the measuring operation to the dosing operation and vice versa.

The weight of the float is so chosen that its top surface will coincide with the liquid level in the vessel at normal atmospheric pressure, while involving only a minimum change in the position of the measuring rod when the compressed fluid is applied.

Another novel feature of the inventive apparatus relates to the provision of a sieve outside the measuring space proper, and in the inlet path of the liquid to be measured. The discharge conduit is on the "clean" side of the sieve, from where the liquid is conveyed to the mixer.

Preferably, the lower portion of the vessel has a conical configuration, serving as a recipient for sludge or other impurities held back by the sieve, which can readily be discharged through a check valve or the like.

Deposits and sediments that may occur inside the vessel are positively prevented by another novel feature of the invention, residing in the provision of a scraper and brush mechanism built into the vessel and rotated or otherwise actuated from outside by way of centrally located, gas-tight connecting and supporting means.

A further feature relates to a preferably pneumatic drive, e.g., a double-acting cylinder system which drives the scraper mechanism by the intermediary of a rack-and-pinion drive. The cylinder is driven by the same compressed air which is used in conveying the liquid. The cylindrical vessel space above the sieve is periodically cleaned by the scraper mechanism, actuated both during the measuring phase and during the dosing or discharging phase of the operation. Preferably, slightly more than one full revolution is performed each time by the scraper and brush elements. Appropriate throttle valves may be provided for the cylinder for regulating the rotational speed of the said elements.

Yet a further important feature relates to the provision of a combined, unitary switching mechanism or arrangement including a plurality of valves. The arrangement has the two operating positions of measuring and dosing, alternating with one another if a continuous operation is required. The switch-over can be both manual and automatic.

Still a further feature of the invention resides in a manually controlled master check valve which initiates the dosing phase once the aforementioned switching arrangement has been pre-set for this operation. Conversely, the master valve is mechanically, pneumatically or otherwise closed, owing to a novel coupling arrangement with the switching arrangement, when the alternate measuring phase is initiated.

It is also a feature of the invention that the measuring vessel is heated from the outside, and properly insulated against heat losses, so as to keep the liquids at a predetermined temperature. This is important for filled bituminous substances requiring relatively high temperatures.

Other objects and advantages of the invention will be appreciated and more fully understood with reference to the following detailed description, when considered with the accompanying drawings, wherein:

FIG. 1 illustrates, in a partly sectional and partly schematic view, a typical arrangement of the measuring and dosing apparatus according to the invention, including a vessel and control means for performing the functions; and FIG. 2 is a partly sectional view of a portion of the measuring and dosing vessel.

It should be noted that the following description relates to a preferred embodiment wherein the inventive measuring and dosing apparatus is connected to or made part of a mixing equipment or device, e.g. for producing bituminous mixtures. The liquid used therein may have a high proportion of suspended solids, easily broken bituminous emulsions, and the like, which make treatment and handling difficult.

The set-up shown in FIG. 1 can, of course, be used without the illustrated mixer, for purposes other than described and illustrated herein, as will be readily understood from the detailed specification.

The inventive apparatus comprises the following major units: a measuring or dosing vessel designated 1, a compressed-air source and system generally designated 2, a control system identified as 3, a storage container or tank 4 for the liquid to be measured and administered, and a mixer generally identified as 5. The liquid to be handled is conveyed to the mixer 5 from container 4, after having determined its exact quantity in vessel 1, by making the use of the compressed air originating from system 2. The operational functions are either manually or automatically controlled by the system 3. The aforementioned major units of the apparatus will now be described in detail.

The first unit, the measuring and dosing vessel 1 includes three major parts, namely a cylindrical measuring portion 11, a pressure-tight cover 12 and a conical withdrawal portion 13, with a sieve 14 interposed between the bottom end of the portion 11 and the top flange of the portion 13. The latter includes an inner supporting structure 131 which carries journaling means 132 for a mechanism 111 inside the cylinder and above the sieve 14, to be described in more detail as the specification proceeds. Conventional heat insulating and/or heating means for the cylindrical vessel portion 11 have been omitted from the illustration for the sake of clarity.

The conical portion 13 has an inlet conduit 133 reaching with its bottom end deep into the storage tank 4, below the liquid level, as well as two outlet or discharge conduits, namely 134 and 135. The former serves for emptying the vessel 1 and conveying the liquid, once its amount has been measured, to the mixer 5, and the latter for removing any sludge or impurity that may have settled from the liquid in portion 13, before passing the sieve 14 in upward direction. It should be noted that conduit 134 opens into the vessel space 11 above the sieve 14. A check valve 1351 having a relatively wide passage is provided in the conduit 135 for closing the same off during normal operation of the apparatus. This valve being only occasionally used, it is not made part of the control system 3.

The cover 12 of the vessel 1 has a central guiding member 121 for journaling a hollow driving member 151 (see FIG. 2) forming part of a drive mechanism denoted 15, to be fully described later. A support structure 112, wedged to member 151, carries a lateral scraper 113 which is rigid at its bottom with the aforementioned mechanism 111. A brush 114 is attached to the mechanism 111, in contact with the sieve 14. It will be seen that the rotation of member 151 will entrain the support 112, the scraper 113 as well as the brush 114. The rotating elements are journaled at 132, as mentioned before.

The gas- and pressure-tight exit of the hollow driving member 151 from the guiding member 121 is insured by the latter being formed into a stuffing box in co-operation with a hollow upper portion 122 and an appropriate packing 123. The members 121, 122 are furthermore provided with sleeve bearings 124 and 125; appropriate recesses are provided in these members for thrust bearings 126 and 127.

The member 151 is secured, e.g. by way of a thread, to a pinion 152, also having a recess for receiving a portion of the bearing 126. A check nut 128 holds the system together. A toothed rack 153 engages the pinion 152 for rotation; as shown in FIG. 1, the rack is actuated by a conventional piston 1541 provided in a double-acting compressed-air cylinder 154 supported from cover 12 of vessel 1 by a bracket 129. The operation of the cylinder 154 will be described together with that of the associated valves, forming part of the control system 3.

A transparent or non-magnetizable metallic indicator tube 181, closed at the top, protrudes from the upper end of member 151; the former lodges a calibrated measuring rod 182, the lower end of which is attached to a float 183 lodged within the cylindrical vessel portion 11.

The float has a weight which provides equilibrium flush with the liquid level of the vessel at regular atmospheric pressure, without, however, resulting in undue changes in the measuring-rod indication when compressed air is applied to the vessel.

The tube 181 is held in member 151 in a gas- and pressure-tight manner by way of a threaded closing member 184 and a stuffing box or packing 185 compressed thereby. The upper end of the tube 181 is secured by a support structure 186 attached to cover 12 by way of an elastic or other suitable bearing member 187. The last-named two elements have been omitted from FIG. 2 for the sake of clarity.

The support 186 also carries a graduation or scale 188 provided to show the liquid level within vessel 1. The tube 181 has therearound two solenoids, or other electrical sensing or control elements namely 381 and 382. The former, at the bottom of the free tube portion, serves to adjust the lowermost or zero level of the float 183. The latter, solenoid 382, is slidably secured to the upper portion of tube 181 (the conventional means herefor being omitted from the drawing) and serves to provide pre-adjustment of the measured liquid quantity or, in other words, the topmost or filled-up level of the float 183. The adjustment of the lower solenoid position has to be made but once, when installing the apparatus. The function of the arrangement will be described somewhat later.

As to the second unit, the source designated 2 includes a compressor 21 for producing the compressed air used to convey the liquid from the storage container 4 to the vessel 1, via conduit 133; the air is distributed by way of supply conduit sections 211. One of the sections leads to an intermediate tank 22 having a pressure regulating valve 221 preferably set to a pressure of 2 atmospheres above normal.

A branch of the conduit 211 leads to another tank 23 having a similar regulating valve 231 which, however, should be set to at least 6 atmospheres above normal, so as to provide the compressed air which discharges the content of the vessel 1 into the mixer 5, via conduit 134, and which actuates and controls the valves and other elements of the control system 3. A conduit 212 connects tank 22 with storage container 4.

Most of the elements of the control system 3, the third unit, are made part of a unitary switching arrangement 31 which includes from the left to the right, as viewed in FIG. 1, two three-way valves 311 and 312, as well as two check valves 313 and 314. The latter are intercalated in the aforementioned conduits 133 and 134, respectively. All four valves are simultaneously operated by a double-acting control cylinder system 32, the piston 321 of which is connected with the aforementioned valves by way of a schematically shown linkage 3211.

The apparatus has two major functions, namely introducing and measuring a pre-determined quantity of the liquid, and discharging or dosing the same to a consumer unit, like a mixer. FIG. 1 illustrates the control system 3, and its units 31, 32 in the second-named, dosing position, identified by the letter "D" wherever applicable. The alternative measuring position appears with letter "M." The positions of the linkage 3211, as well as the directional arrows identifying the flow of air and liquid are shown in solid lines for "D" and in broken lines for "M." Additionally, double arrows have been used for the direction of flow of the liquid (conduits 133 and 1344, from tank 4 to vessel 1 and thence to mixer 5).

A separate, preferably electro-magnetically actuated, master check valve 33 is co-ordinated with three-way valve 312; a switch 331 is provided for energization of the solenoid which controls the valve 33. Both valves 311 and 33 are connected to a section of compressed-air supply conduit 211.

The cylinder system 32 has two three-way valves, 322 and 323, co-ordinated thereto, both being linked to the same section of conduit 211. Both valves are electro-magnetically operated; the solenoid of valve 322 is linked to the electrical element 381 by way of a schematically indicated electrical circuit 3811 (shown with a broken line), while valve 323 is, in turn, connected to element 382 in a similar fashion via leads 3822.

It should be noted that an electrical current supply circuit has been omitted, for the sake of clarity, from the drawing, together with any conventional circuit element (e.g. relays, contactors, time delays or the like) that may be used in an electro-pneumatic control system of the kind here described. A supply lead 3821 is also connected to element 382, for energizing switch 331 and thence the electro-magnetic valve 33.

When the rod 182 inside vessel 1 has reached its lowermost position, the circuit 381 will become activated which opens the valve 322 via circuit 3811, so that compressed air, supplied by conduit section 211, is impressed upon the right-hand side of piston 321 by way of a conduit 324, urging the same to the left. Linkage 3211 connected to the piston 321 now moves the switching arrangement 31 to the M position, shown in broken lines, so as to force liquid into vessel 1. The air expelled from cylinder 32 passes through a conduit 325 to valve 323 which is now in its actuated or closed position, discharging the air through the third limb which opens into the atmosphere (as shown by the broken-line arrow M).

The operation is reversed when the float 183 reaches the predetermined "full" position to which the upper, slidable solenoid element 382 is set along scale 188. Upon energization of circuit 382, valve 323 is opened via leads 3822, so that the compressed air is allowed to pass from conduit 211 to the left-hand side of piston 321, urging the same to the right. This brings the valves 331–314 of unit 31 to the solid-line D position, so as to discharge the measured liquid from vessel 1. In this case, the air expelled from cylinder 32 passes in the opposite direction, that is through conduit 324 and valve 322, where it is dischargd through the open third limb (solid-line arrow D).

The respective admitting and discharging valves 313, 314 do not require further explanation since they are alternately open and closed in the M (measuring) and D (dosing) positions of control unit 31.

The three-way valves 311, 312 are linked, on their sides opposite the connection with supply conduit 211, to respective conduits 315, 316 which have a dual function, namely to assist in discharging (and partly in filling up) the vessel 1, and to actuate cylinder 154 for actuating the scraper and brush mechanism 113, 114 inside the vessel.

When the apparatus is set for introducing and measuring the pre-determined amount of liquid in vessel 1, and the liquid is forced thereinto by compressed air via conduit 212, tank 4, conduit 133 and across open valve 313, the air escaping from within the cylindrical measuring tank portion 11 is led through conduit 316 to valve 312 and to the atmosphere, via the lateral limb marked M.

When set for discharging and dosing, the flow of compressed air is in the opposite direction, viz., from conduit 211 over valve 33 (when actuated) to valve 312, conduit 316 and into vessel 1, whereby the liquid is forced out from the space 11, so as to pass along conduit 134 and into the mixer 5.

It should be noted that the circuit 3821 only prepares the energization of valve 33 when the float has reached the topmost position. An added safety measure is provided in that switch 331 has to be manually operated before the actual discharging or dosing commences, by introduction of compressed air into the vessel 1.

In both the measuring and dosing operations, cylinder 154 will perform one cycle of operation; moving the piston 1541 either from left to right (measuring) or from right to left (dosing). Both movements corresponds, owing to the provision of, and ratio of teeth between, toothed rack 153 and pinion 152, to at least one full revolution of the scraper and brush mechanism 113, 114 inside the vessel 1.

When measuring of the liquid is performed in the first operational phase, compressed air is passed from conduit 211 through valve 311 to conduit 315 and thence to the left-hand side of piston 1541 via a first throttle valve 1542. The air displaced by the piston traverses a second throttle valve 1543, where it joins the air escaping from within the vessel 1, to be discharged to the open through conduit 316 and the third limb of valve 312, as has been described before.

When, however, dosing of the liquid is performed in the second phase, the air is made to enter conduit 316 via valves 33 and 312, so as to act on the right-hand side of piston 1541, via valve 1543. The air displaced by the piston is discharged through valve 1542, conduit 315, and the lateral limb of valve 311, marked D.

In both operation phases, the scraper 113 and the brush 114 will be rotated all around the inner wall of vessel 1; this occurs in a counter-clockwise sense while the liquid rises in vessel 1 (measuring) in a clockwise sense while it is discharged therefrom (dosing). The sense of rotation may, of course, be opposite if, for example, rack 153 attacks pinion 152 from the opposite side.

The valves 1542 and 1543 allow the speed to be adjusted at which the scraper and brush mechanism will rotate, including the total time of rotation as compared to that needed for the actual measuring-in and discharging of the liquid. The speed and the time can, of course, be set to different values for measuring and for discharging, depending on whether the respective cylinder inlet valve is opened to a larger or small degree (e.g. valve 1542 for "measuring," of valve 1543 for "dosing").

As to the last-mentioned main unit, the mixer 5, it includes nozzles 51 through which the liquid conveyed via conduit 134 is administered into the mixture contained therein. Preferably, non-return valves 1341 are intercalated so as to avoid the liquid from flowing back in conduit 134, which would alter the quantity of administered liquid, e.g., if the mixer 5 is at a higher level than the vessel 1.

A balance hopper 52 is schematically shown, for introducing solids and other substances to which the liquid of tank 4 has to be added or mixed. The stirring or mixing mechanism proper is schematically shown at 53.

It will be understood that the preceding description only relates to a preferred embodiment of the invention and is not be construed in a limiting sense, since many a departure and modification is possible from the structural details shown herein, as set forth in the claims appended hereto.

I claim:

1. A measuring and dosing apparatus for handling thermoplastic and bituminous substances difficult to convey, comprising, in combination, a hermetically sealed measuring vessel, means for introducing a predetermined quantity of a liquid substance into said vessel, means for discharging the liquid of measured quantity from said vessel, and a source of compressed fluid for assisting at least one of the aforementioned means, said vessel comprising a cylindrical measuring zone, further including inlet means and outlet means for said liquid, as well as filter means between said inlet means and said measuring zone, said outlet means communicating with said measuring zone.

2. An apparatus as defined in claim 1, wherein said vessel further includes a conical space communicating with said inlet means, and discharge means for removing sludge and impurities accumulated in said conical space from said liquid before it passes said filter.

3. An apparatus as defined in claim 1, further comprising rotatable scraper means in said measuring zone of the vessel, and means for rotating said scraper means during the operation of at least one of said introducing means and said discharging means.

4. An apparatus as defined in claim 3, wherein said vessel has a hermetically sealed cover including substantially central guide means for said rotating means, the latter including a pinion rigid with an extension of said scraper means, and a reciprocable toothed rack acting upon said pinion.

5. An apparatus as defined in claim 4, wherein said rotating means further includes a double-acting cylinder having a reciprocable piston connected to said toothed rack, said cylinder being selectively actuated by said compressed fluid for operating said scraper means.

6. An apparatus as defined in claim 5, further comprising at least one check valve for controlling the amount of said compressed fluid reaching said cylinder and thus controlling the speed of rotation of said scraper means.

7. A measuring and dosing apparatus for handling thermoplastic and bituminous substances difficult to convey, comprising, in combination, a hermetically sealed measuring vessel, means for introducing a predetermined quantity of liquid substance into said vessel, means for discharging the liquid of measured quantity from said vessel, and a source of compressed fluid for assisting at least one of the aforementioned means, said introducing means and said discharging means jointly including hydraulic switching means for controlling the functions of introducing said liquid from an extraneous storage container into said vessel, and of discharging said liquid of measured quantity from said vessel, said hydraulic switching means including at least one check valve controlling the flow of said liquid and at least one three-way valve controlling the flow of said compressed fluid, the third limb of said three-way valve opening into the atmosphere for selectively discharging displaced air therethrough.

8. An apparatus as defined in claim 7, further comprising rotatable scraper means in said vessel, and means for rotating said scraper means including a double-acting cylinder having a reciprocable piston operatively connected to said scraper means, said cylinder being hydraulically connected with said switching means so that said scraper means is rotated both during said introducing and said discharging function.

9. An apparatus as defined in claim 8, wherein the sense of rotation of said scraper means is reversed between said introducing and said discharging functions.

10. An apparatus as defined in claim 7, wherein said hydraulic switching means further includes a double-acting cylinder having a reciprocable piston operatively connected to said valve, for operating said introducing means and said discharging means in respective end positions of said piston.

11. An apparatus as defined in claim 10, further comprising a float within said vessel free for vertical reciprocation depending upon the liquid level in said vessel, and control means responsive to the positions of said float for initiating the movement of said piston in alternating directions depending upon the lowest and a predetermined upper positions of said float.

12. An apparatus as defined in claim 11, wherein said control means includes electro-magnetic means responsive to said float positions and at least one three-way valve means acted upon by said electro-magnetic means.

13. An apparatus as defined in claim 10, further comprising a master check valve interposed between said compressed-fluid source and said three-way valve for initiating at least one of said functions upon having pre-set operation of said switching means.

14. An apparatus as defined in claim 13, further comprising sensing means responsive to the liquid level in said vessel and including electric means for preparing an energizing path for said master check valve.

15. An apparatus as defined in claim 14, further comprising heating means for said vessel.

References Cited

UNITED STATES PATENTS

| | | | |
|---|---|---|---|
| 1,126,130 | 1/1915 | Torchianai | 222—373 |
| 2,625,042 | 1/1953 | Binford | 222—67 |
| 2,669,941 | 2/1954 | Stafford | 222—373 X |
| 2,853,877 | 9/1958 | Smith | 222—67 X |
| 2,885,118 | 5/1959 | Remke | 222—68 |
| 2,961,880 | 11/1960 | Griswold | 222—67 X |
| 3,045,485 | 7/1962 | Smith | 222—68 X |
| 3,065,880 | 11/1962 | Brown | 222—450 X |
| 3,224,639 | 12/1965 | Sebastian et al. | 222—68 |

FOREIGN PATENTS 83,204   7/1957   Denmark.

ROBERT B. REEVES, *Primary Examiner.*

H. S. LANE, *Assistant Examiner.*